United States Patent [19]
Selyutin

[11] Patent Number: 5,337,310
[45] Date of Patent: Aug. 9, 1994

[54] BACKPLANE COMMUNICATION SYSTEM AND METHOD

[75] Inventor: Sergey Selyutin, Arlington, Mass.

[73] Assignee: Chipcom Corporation, Southborough, Mass.

[21] Appl. No.: 988,687

[22] Filed: Dec. 10, 1992

[51] Int. Cl.5 .............................................. H04L 12/40
[52] U.S. Cl. .................................. 370/85.3; 370/94.1
[58] Field of Search .................... 370/85.2, 85.3, 85.1, 370/85.6, 94.1, 94.2, 60, 61, 85.13, 85.8; 340/825.5, 825.51, 825.05

[56] References Cited

U.S. PATENT DOCUMENTS

| | | | |
|---|---|---|---|
| 4,745,596 | 5/1988 | Sato | 370/85.2 |
| 4,872,163 | 10/1989 | Follett et al. | 370/85.2 |
| 5,175,730 | 12/1992 | Murai | 370/85.2 |
| 5,195,089 | 3/1993 | Sindhu et al. | 370/85.2 |

OTHER PUBLICATIONS

Bob Roman, Designing a Third Generation Hub Meets the Network Challenge, Computer Technology Review, vol. XI, No. 16, Feb. 1992, pp. 25–29.

*Primary Examiner*—Benedict V. Safourek
*Assistant Examiner*—Dang Ton
*Attorney, Agent, or Firm*—McGlew & Tuttle

[57] ABSTRACT

A backplane communication system based on CSMA/CD protocol including a plurality of communication nodes and method of encoding/decoding data via backplane bus. Each communication node (1) has transmit and receive data links (2,3) connected to the backplane bus (8) via an encoder/decoder (4,5) and also has a transmitter/receiver (6,7) whereby all data transmitted by any node may be passed to the backplane bus and between all communication nodes. Each node is synchronized by the backplane clock (9), so that data may be transmitted and received by the communication nodes via the backplane bus in a synchronous mode. The encoder/decoder provides for detecting a collision on the backplane bus as well as for passing slot identification information between communication nodes.

21 Claims, 8 Drawing Sheets

ARCHITECTURE BACKPLANE COMMUNICATION SYSTEM

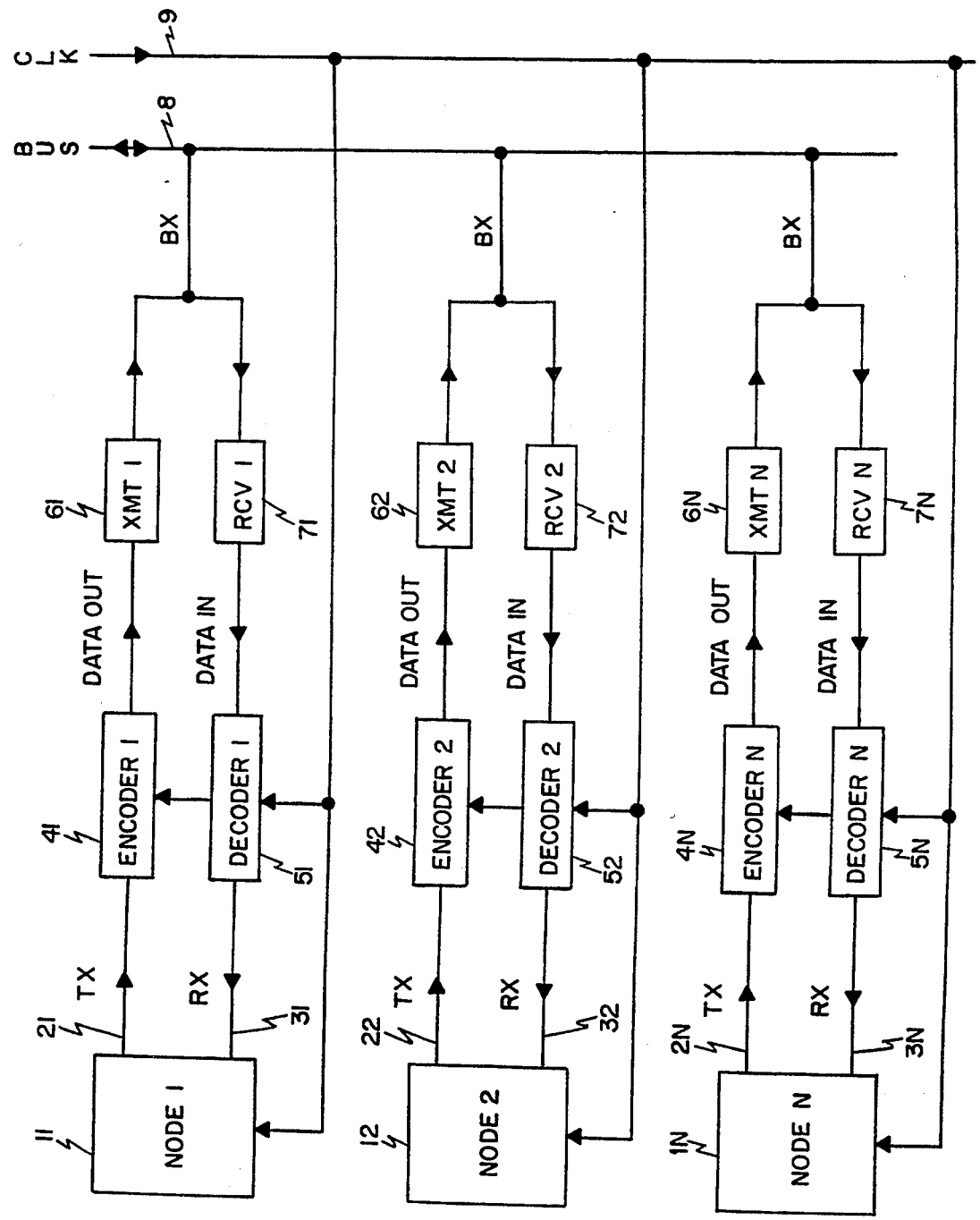
FIG. 1 ARCHITECTURE BACKPLANE COMMUNICATION SYSTEM

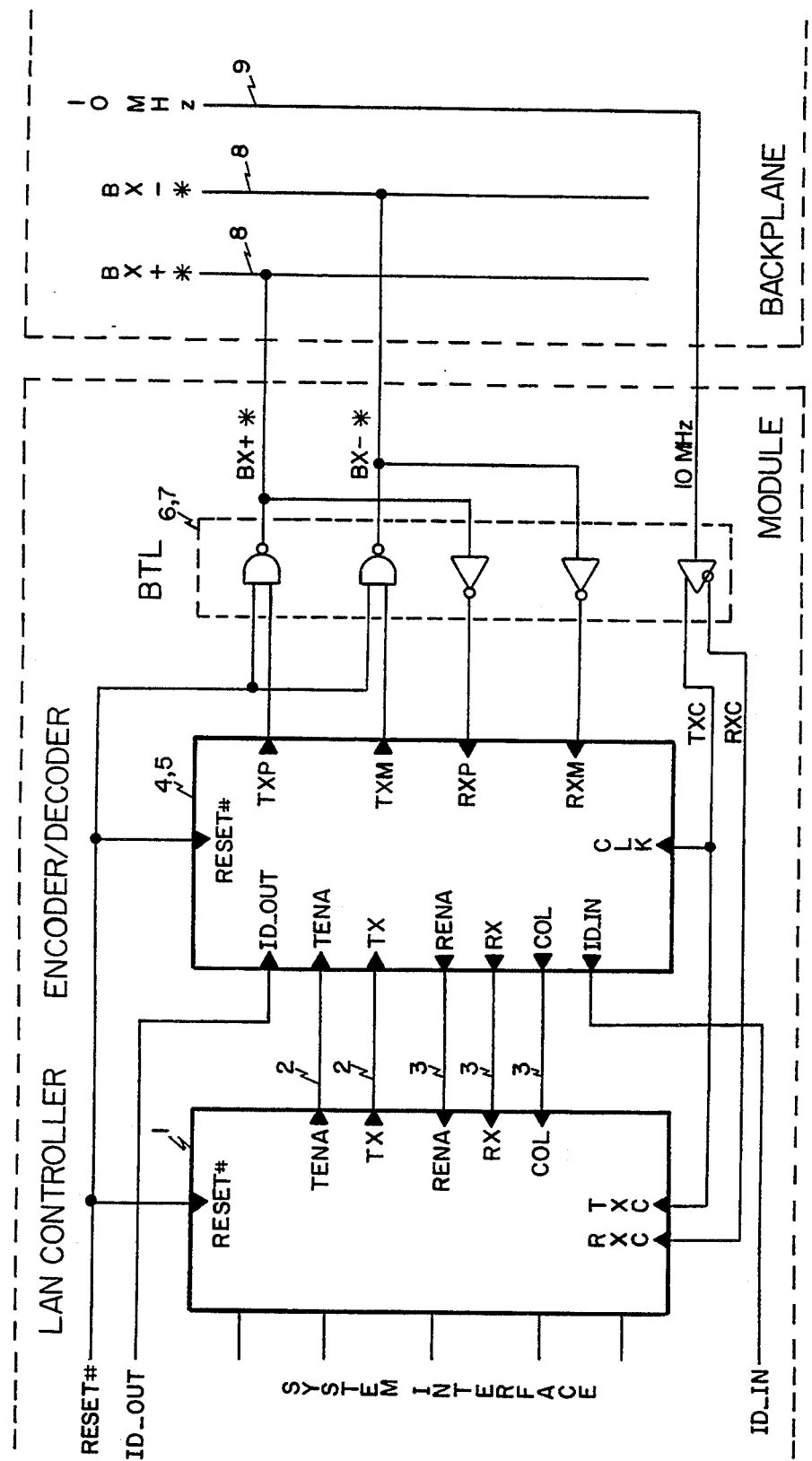
FIG. 2 LAN CONTROLLER BACKPLANE INTERFACE

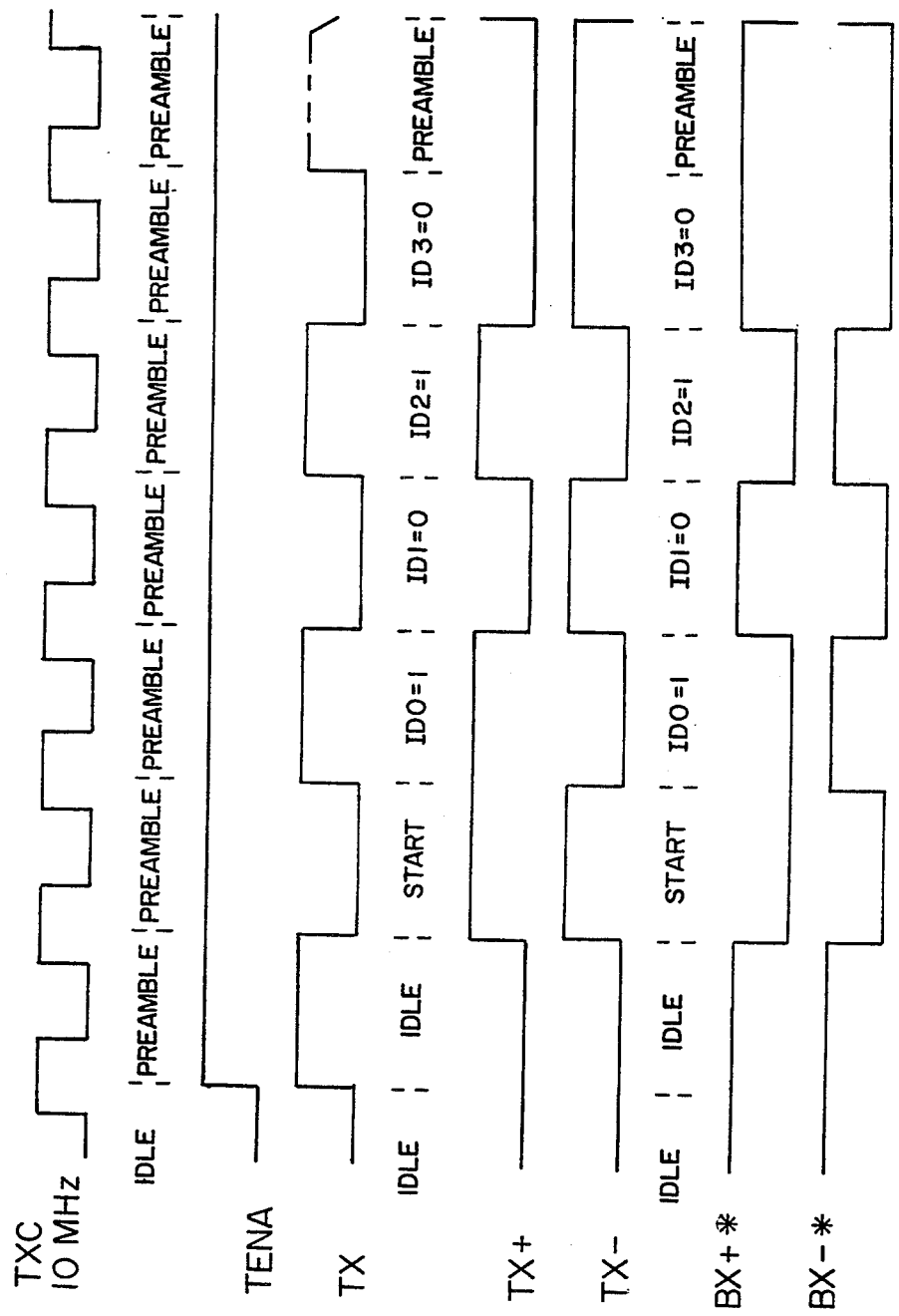
FIG.3A TRANSMIT TIMING

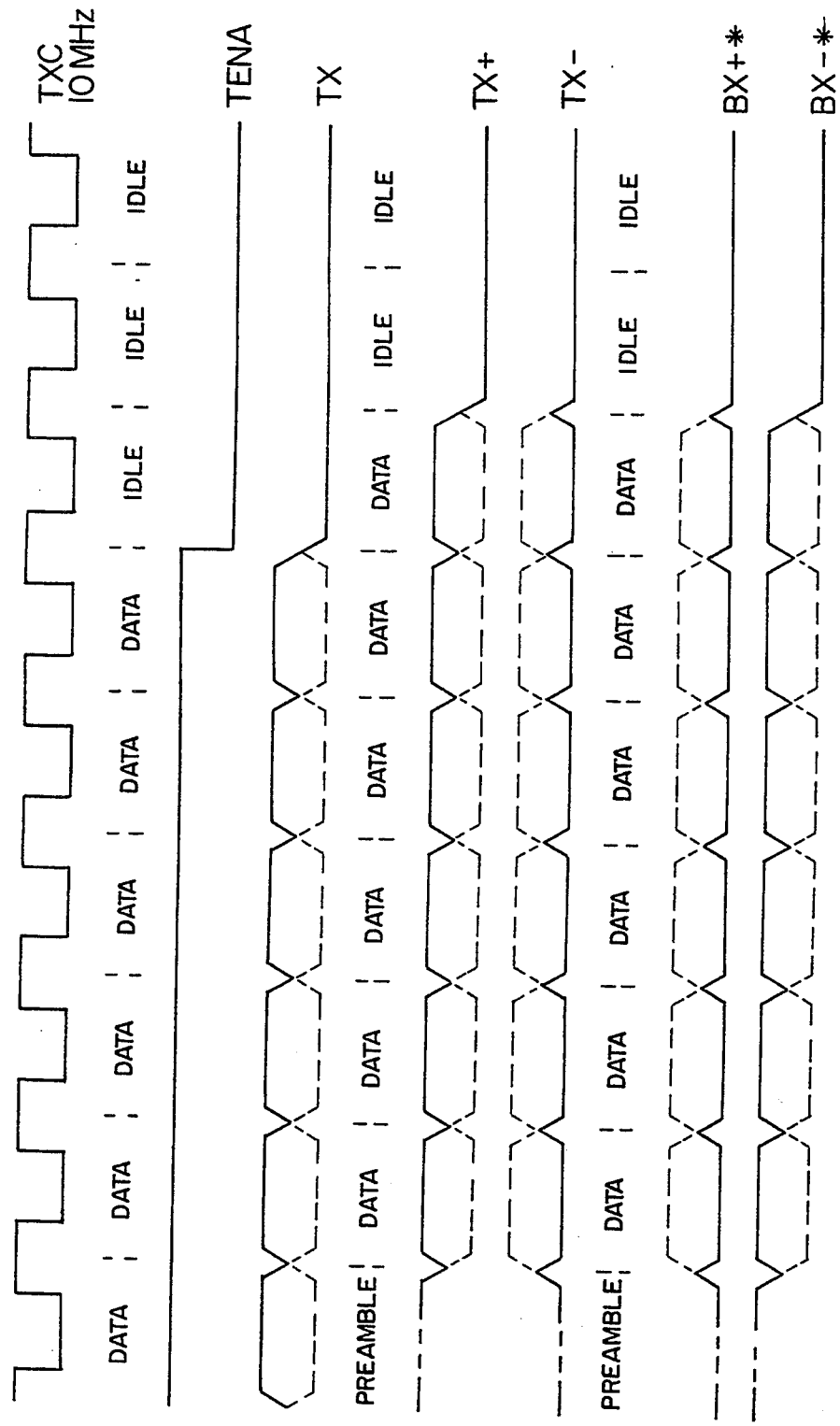
FIG.3B TRANSMIT TIMING

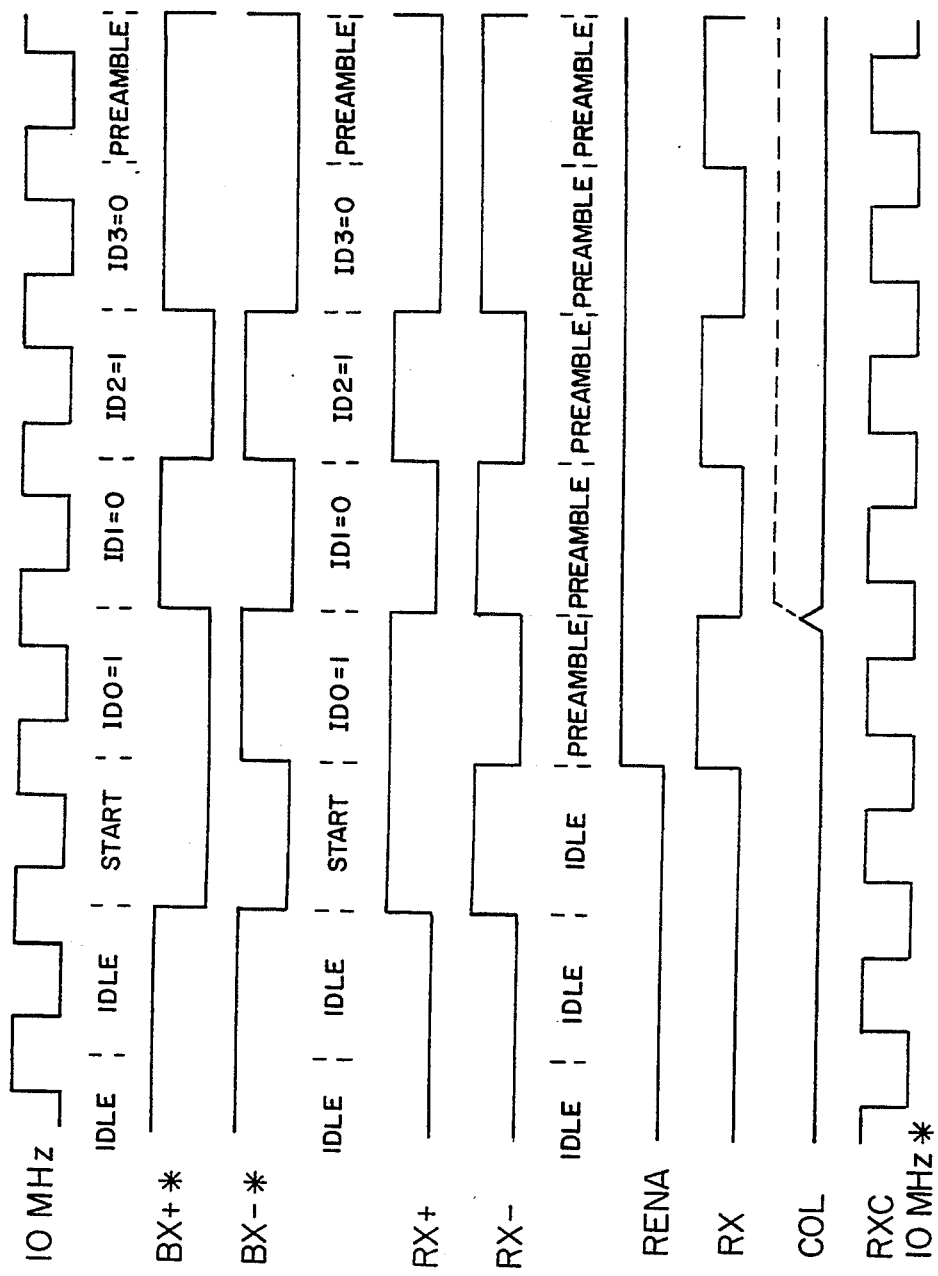
FIG.4A RECEIVE TIMING

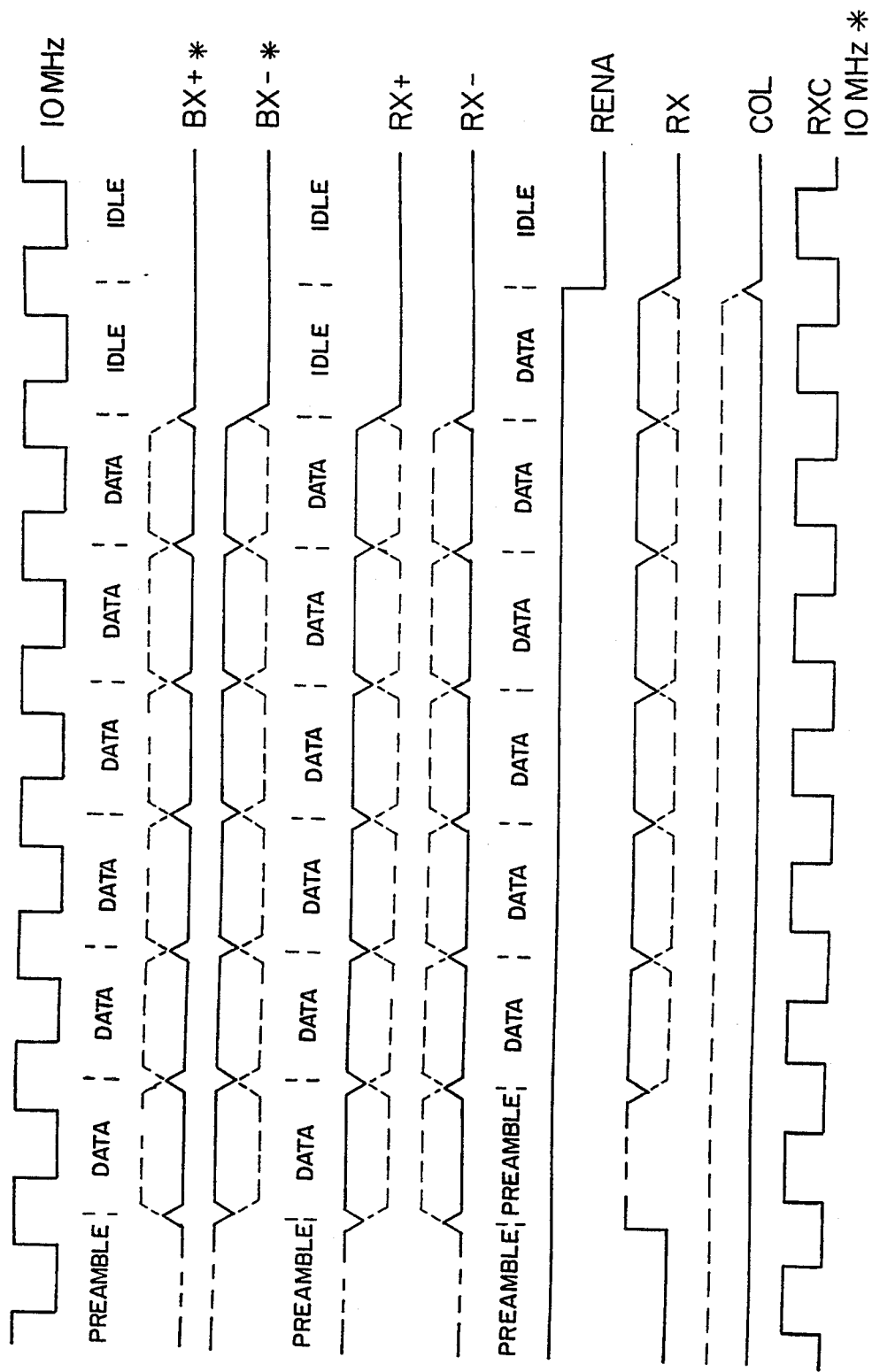
FIG.4B RECEIVE TIMING

TRANSMIT STATE MACHINE

RECEIVE STATE MACHINE

BACKPLANE COMMUNICATION SYSTEM AND METHOD

FIELD OF THE INVENTION

The invention relates to a backplane communication system based on CSMA/CD (carrier sense, multiple access with collision detection) protocol wherein a plurality of communication nodes are provided linked by a backplane bus and more particularly to LAN (local area network) system concentrators (i.e. smart hubs) as a means of communication between different modules (nodes) within a hub via a backplane bus. The invention relates more particularly to a collision detection method and system for detecting collisions over switching hubs or concentrators.

BACKGROUND OF THE INVENTION

Smart hubs and the architectures of such smart hubs are described in an article "Designing a Third Generation Hub Meets the Network Challenge" by Bob Roman in "Computer Technology Review", Vol. 11, No. 16, February 1992, pp. 25-29. Problems have been encountered with regard to high speed and cost effective communication for such hub backplane communication systems. Particular problems have been encountered with regard to collision detection and slot identification associated with CSMA/CD protocols based on bus topology.

Collosion detection time is a major component with regard to 802.3 protocols and, to a great extent, defines a performance level. Various different methods are being used for minimize collision detection time. Such methods often involve large pieces of collision detection hardware integrated into the hub modules.

One of such methods is based on slot comparison during transmission. This method also requires additional pins to be provided on the backplane segments for slot identification (slot ID). With such a method, the number of slot ID pins is defined as binary log N, where N is the number of nodes, communicating over a backplane segment. For example, a backplane segment with 32 nodes will require 5 pins for the slot ID. Such an arrangement is necessarily a drawback with regard to cost and simplicity of the overall system implementation (including hardware and software).

SUMMARY AND OBJECTS OF THE INVENTION

It is an object of the invention to provide a backplane communication system which enables a number of nodes to communicate within a hub at high data rates in a range of 1 to 10 Mb/s using CSMA/CD access techniques and protocols as defined by IEEE (Institute of Electrical and Electronics Engineers) 802.3 Standard and which employs an encoding/decoding method to ensure minimal collision detection time without requiring backplane slot ID pins. Redundant communication links to the bus of the backplane may be provided by some communication nodes in order to achieve hub fault tolerance.

The backplane communication system and method according to the invention may be used in smart hubs as:
 means of in-band communication via a backplane segment between hub modules, supporting 802.3 protocols;
 means of management communication via a backplane bus using 802.3 protocols between all hub modules.

It is also an object of the invention to use such an encoding/decoding method to allow slot ID information to be passed via the same communication bus between hub modules for management purposes.

According to the invention, a backplane communication system based on the CSMA/CD protocol is provided which comprises a plurality of communication nodes and a method and system of encoding/decoding data via backplane. Each communication node is provided with a transmit and receive data link, wherein these links are connected to the backplane bus via an encoder/decoder and a transmitter/receiver. All data transmitted by a particular node is passed through the backplane bus between all nodes. Each node is synchronized by the backplane clock, so that data may be transmitted and received by communication via the backplane bus in a synchronous mode. The invention provides means for detection of a collision on the backplane bus as well as means for passing slot identification information between communication nodes.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a block diagram of the backplane communication system according to the invention;

FIG. 2 is a circuit diagram, showing generic control and data signals of a LAN controller, interfacing the backplane;

FIGS. 3A and 3B are a timing diagram showing waveforms of the LAN controller and backplane signals in transmit mode;

FIGS. 4A and 4B are a timing diagram showing waveforms of the LAN controller and backplane signals in the receive mode;

DETAILED DESCRIPTION OF THE PREFERRED EMBODIMENT

Figure 5:
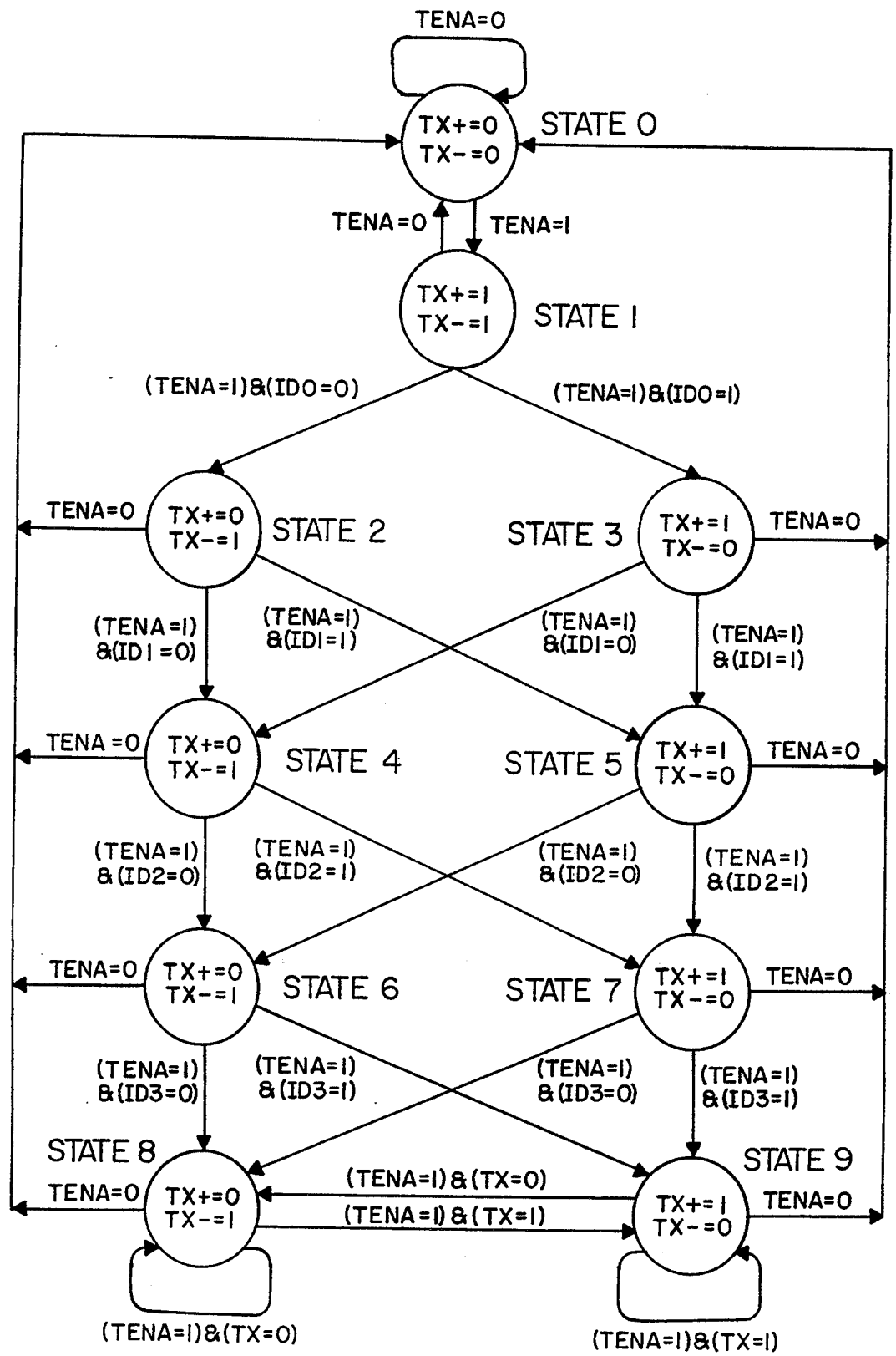
FIG. 5 is a state diagram defining state transitions and output signals of the transmit state machine.

Referring to the drawings in particular, the invention comprises a plurality of communication nodes, generally designated 11, 12, ... 1N as shown in FIG. 1, where N is a number of nodes interfacing with the hub backplane communication system. Each communication node has transmit data links 21, 22, ... 2N and receive data links 31, 32, ... 3N interfacing with a bi-directional backplane bus 8, whereby transmitted data may be passed through the backplane bus and between all communication nodes. The transmit data links are connected to the bus via encoders 41, 42, ... 4N and transmitters 61, 62, ... 6N. The receive data links are connected to the bus via receivers 71, 72, ... 7N and decoders 51, 52, ... 5N. Communication data are typically generated by LAN controllers, supporting 802.3 protocols. All communication nodes, encoders and decoders are synchronized with the backplane clock 9 (typically 10 MHz), which enables use of a relatively simple method of clocking-out, clocking-in and encoding/decoding of the data.

FIG. 2 shows the details of an interface between LAN controller (communication node) 1, encoder/decoder 4,5, transmitter/receiver 6,7 and backplane bus 8. The communication subsystem of the LAN controller is considered the focus of this invention.

FIG. 2 also shows generic control and data signals of the typical LAN controller (e.g. industry standard LANCE 7990) along with other interface signals:

| | |
|---|---|
| TxC | transmit clock (10MHz), input; |
| RxC | receive clock (10MHz), input; |
| TENA | transmit enable, output, active HIGH; |
| TX | transmit data, output; |
| RENA | receive enable, input, active HIGH; |
| RX | receive data, input; |
| COL | collision detect, input, active HIGH; |
| TX+ | encoded data, output; |
| TX− | encoded data, output; |
| BX+* | backplane data, bi-directional; |
| BX−* | backplane data, bi-directional; |
| RX+ | decoded data, input; |
| RX− | decoded data, input; |
| ID-OUT | outcoming ID bit stream, input; |
| ID-IN | incoming ID bit stream, output; |
| RESET* | system reset, input, active LOW. |

All LAN Controllers use NRZ (non-return-to-zero) encoding of the frame bits and 10 MHz as TxC/RxC clock. The backplane bus consists of two bi-directional lines (BX+* and BX−*) used for data communication between hub modules. These lines are connected to the inputs/outputs of the encoders/decoders via transmitters and receivers. The backplane bus is driven by open collector drivers (transmitters), so that colliding data from different LAN Controllers will force the bus into "collision" state or code, as described later.

Whenever data is transmitted over the lines, a differential code is used. One line carries the 1's and 0's as high and low voltage levels respectively, and the other line carries the 1's and 0's as low and high voltage respectively, or the opposite of the first line. The high voltage can be considered a first state of the lines and the low voltage can be considered the second state of the lines. A communication node drives each of the backplane bus lines BX+* and BX−* with a transmitter. Both backplane bus lines can be considered to be normally in a high or 1 state. Each transmitter pulls its respective line down when a low or zero is to be transmitted. If two communication nodes are transmitting different data, or a different bit state, at the same time, then both lines will be pulled low. This condition or state where both lines are low or zero, is known as the collision state or code, since it is caused by two different nodes trying to put different bit states onto the backplane bus lines.

BTL (bus transceiver logic), like Texas Instruments' or National Semiconductor's drivers/receivers, may be used to implement this interface to the backplane bus.

The encoders/decoders provide code conversion between the NRZ code, generated by the LAN controller and the differential code, used on the backplane. They can be implemented as state machines.

Encoders/decoders are also synchronized with a 10 MHz clock and provide proper transmit/receive timing for:

differential encoding of NRZ data and clocking it out to the backplane bus;

clocking in data from the backplane bus and differential decoding to NRZ with collision detection.

The backplane differential encoding scheme is represented in Table 1.

TABLE 1

| LANCE - Backplane Encoding. | | | | | |
|---|---|---|---|---|---|
| LANCE TX Signals | | Diff. TX Signals | | Backplane Signals | Backplane Bus |
| TENA | TX | TX+ | TX− | BX+* BX−* | State |
| 0 | x | 0 | 0 | 1    1 | idle |
| 1 | 0 | 0 | 1 | 1    0 | data '0' |
| 1 | 1 | 1 | 0 | 0    1 | data '1' |

The backplane differential decoding scheme is represented in Table 2.

TABLE 2

| Backplane - LANCE Decoding. | | | | | | | |
|---|---|---|---|---|---|---|---|
| Backplane Signals | | Diff. RX Signals | | LANCE RX Signals | | | Backplane Bus |
| BX+* | BX−* | RX+ | RX− | RENA | RX | COL | State |
| 1 | 1 | 0 | 0 | 0 | 1 | 0 | idle |
| 1 | 0 | 0 | 1 | 1 | 0 | 0 | data '0' |
| 0 | 1 | 1 | 0 | 1 | 1 | 0 | data '1' |
| 0 | 0 | 1 | 1 | 1 | 1 | 1 | collision |

As can be seen from Tables 1, 2 the codes for '0' and '1' frame bits are assigned such that colliding data drives open collector bus signals BX+* and BX−* into a '00' state, and this state corresponds to a collision code or state. This assignment allows a simple collision detection technique to be implemented in a decoder (receive) state machine. A collision code or state is also used in encoder/decoder state machines as start frame code.

FIGS. 3(a)-3(b) show a timing diagram of the LAN controller transmit signals, encoder outputs and backplane signals in transmit mode with the leading and trailing edges slightly offset to represent propagation time. A LAN controller generates the data for the communication node. The LAN controller generates TENA and TX signals, synchronized with TxC clock. The frame starts with HIGH to LOW preamble bits. The encoder (transmit) state machine generates differentially encoded signals TX+ and TX−, according to Table 1 (above). The very first preamble bit, though, is encoded as '11', which corresponds to a start frame code '00' on the backplane. The encoder state machine also replaces preamble bits of a data transmission coming from a LAN controller, with slot ID bits. The slot ID bits identify the communication node or the slot which the particular communication node is plugged into (the node is connected to the backplane by means of a hub or concentrator slot connection) and each slot or node has a unique slot ID. In this way if two nodes are transmitting onto the backplane at the same time, it is guaranteed that at some point the two nodes will be transmitting a different bit state and both backplane lines will be low. This will then result in a collision state or code.

For example, FIGS. 3(a)-3(b) shows four slot ID bits 1,0,1,0('01','10','01','10') transmitted serially over BX+*, BX−* pair, following start frame code '00'. After slot ID bits are inserted, the preamble and the rest of the frame bit stream are transmitted without changes.

FIGS. 4(a)-4(b) shows timing diagram of the backplane signals, decoder inputs and LAN control receive signals in receive mode. The leading and trailing edges are also slightly offset from one signal to another to also represent propagation time. The decoder state machine receives differential signals RX+ and RX− and generates RENA and RX signals, synchronized with TxC clock, according to Table 2. It detects the start frame code and substitutes it with the first (HIGH) preamble bit. After that it replaces the four serial slot ID bits 1,0,1,0 with regular preamble bits, toggling RX signal from LOW to HIGH as shown in FIGS. 4(a)-4(b). Should a collision occur the decoder state machine also generates a COL signal and holds it up to the end of the frame. The LAN controller latches the decoder outputs RENA, RX and COL with the RxC clock.

FIG. 5 shows the state diagram of an encoder (transmit) state machine. State 0 corresponds to an idle mode. Upon detecting an active TENA signal, the encoder generates start frame (collision) code in state 1 and then switches through the states 2,3...8,9 depending on the value of the slot ID bits to be inserted and the normal frame bits. States 2,3...6,7 provide insertion of the serial slot ID bit stream on the backplane during the transmission of the preamble. After the slot ID bit stream expires the encoder resumes switching between states 8 and 9 and to generate the remainder of the frame bit stream on the backplane. Any time the TENA signal goes inactive, the encoder switches to state 0 (idle mode) and stays there, until the TENA signal becomes active again.

Figure 6:
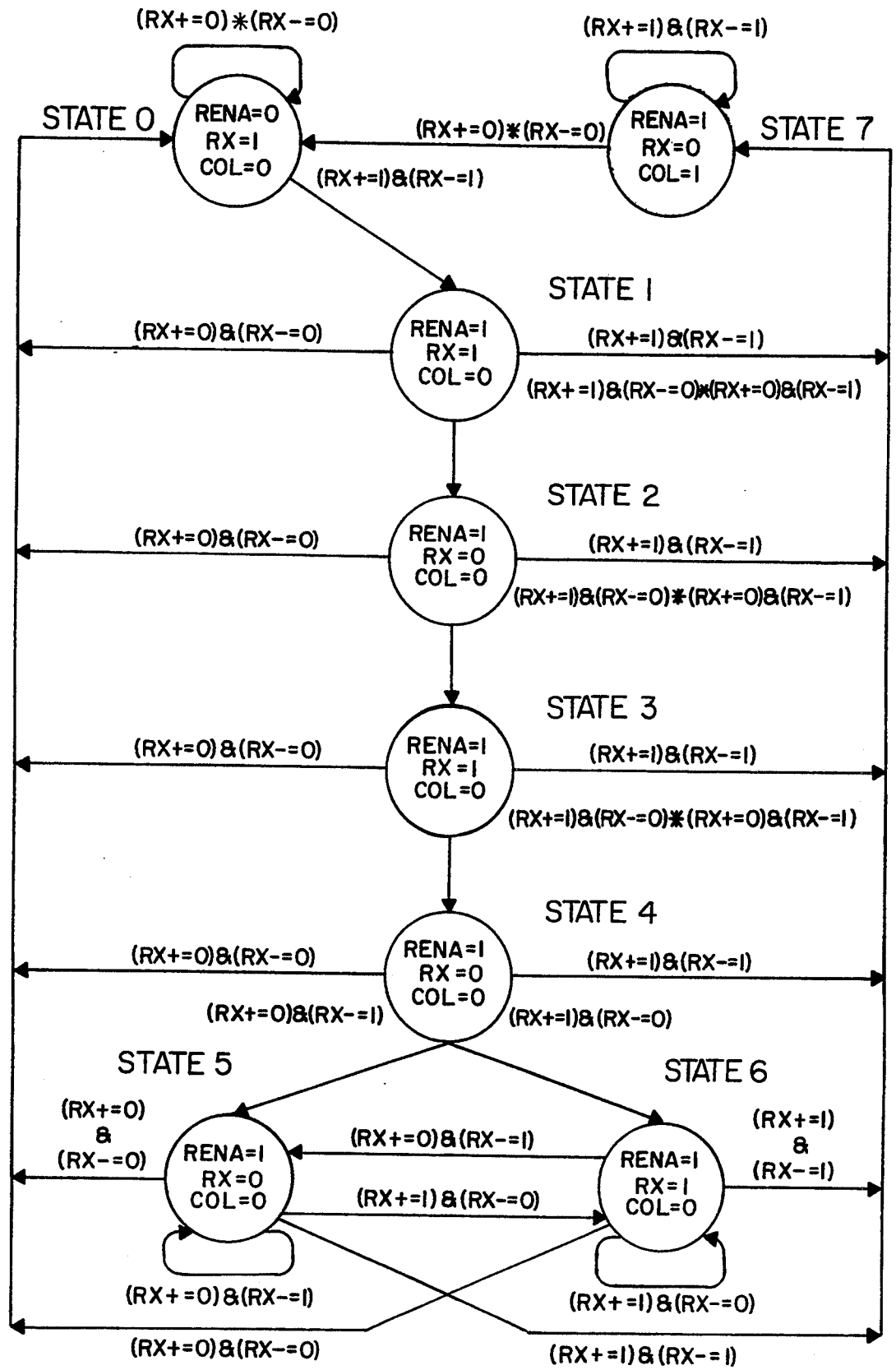
FIG. 6 is a state diagram defining state transitions and output signals of the receive state machine.

FIG. 6 shows state diagram of decoder (receive) state machine. State 0 corresponds to an idle mode. Upon detecting start frame (collision) code (RX+ = 1, RX− + 1), the decoder switches to a receive enable state, shown in FIG. 6 as state 1, and generates a first preamble bit. It then switches through states 2,3,4 recovering or recreating the preamble bit to replace the slot ID bits previously inserted into the stream. After it continues switching between states 5 and 6, to generate the rest of the frame bit stream. Any time the receive bit stream expires (RX+ =0, RX− =0), the decoder switches to an idle mode (state 0) and stays there, until the next frame is received. If a collision code (RX+ =1, RX− =1) is detected on the backplane, the decoder switches to a collision reset state, shown in FIG. 6 as state 7, and stays there until the collision state expires and after that it switches to state 0 (idle).

Although the timing and state machine diagrams shown reflect the case of a four bit slot ID stream, the timing and state machines can be easily upgraded to generate a larger slot ID bit stream. This will result in more slot ID insertion states and more slot ID recovery states added to the encoder and decoder state machines, respectively. Also not reflected in the decoder state machine diagram is a slot ID bit stream output. The slot ID bits can be easily recovered by the decoder and used for passing node slot ID information between modules.

The value of collision detection time is one of the major components defining performance characteristics of 802.3 protocols. In traditional applications, which deal with long node-to-node distances (up to 2.5 Km), collision detection time is based on the round trip propagation delay and can be as big as 48.0 us (480 times the 10 MHz clock). This invention applies to switching hubs (as opposed to the long node-to-node distances), where maximum node-to-node distance is about several meters, so round trip propagation delay is no longer a basis for collision detection time. The invention provides minimization of collision detection time in regards to two different scenarios of frame collision.

The first scenario deals with misaligned packets, i.e. when two nodes start packet transmission at different times. Collision detection time in this case is minimized by using a frame start (collision) code at the beginning of each frame. In this way any subsequent frame start (collision) code will be treated by a decoder as real collision and signalled right away to each receiving node. This scenario results in 100 ns collision detection time (1 times 10 MHz clock).

The second scenario deals with aligned packets, i.e. when two nodes start packet transmission at exactly the same time. Collision detection time in this case is minimized by inserting the serial slot ID bit stream after the start frame code. In this way at least one bit frame is guaranteed to collide within the slot ID stream window. Worst case collision detection time is defined by the length of slot ID bit stream (4 bits for 16 nodes in our example) plus start frame bit. This scenario results in 500 ns collision detection time (5 times 10 MHz clock).

Node slot ID bit stream insertion and recovery also provides an in-band means for passing slot ID between communication node processors by using the same communication backplane bus and minimizing the number of backplane bus pins. The node slot ID information may be used for various management purposes, like collecting hub communication statistics.

While specific embodiments of the invention have been shown and described in detail to illustrate the application of the principles of the invention, it will be understood that the invention may be embodied otherwise without departing from such principles.

What is claimed is:

1. A backplane communication system comprising:
   a backplane bus;
   a plurality of transmitter means for transmitting data packets onto said backplane bus, said backplane bus and each of said transmitter means cooperating to have a substantially simultaneous transmission from two transmission means combine to cause a collision code on said backplane bus, each of said transmission means also preceding a data packet transmission onto said backplane bus by transmitting said collision code on said backplane bus; and
   receiver means for receiving said data packets from said backplane bus, said receiver means being in an idle state when there is no data packet on said backplane bus, said receiver means transitioning to a receive enable state after receiving said collision code from said backplane bus, said receiver means transitioning from said receive enable state to a collision state when said collision code is received in said receive enable state.

2. A system in accordance with claim 1, wherein:
   said receiver means transitions from said collision state to said idle state after said collision code is removed from said backplane bus.

3. A system in accordance with claim 1, further comprising:
   synchronizing means for synchronizing said transmission and receiving of said data packets by said transmission and receiving means.

4. A system in accordance with claim 1, wherein:

said transmitting means and said receiving means employ CSMA/CD protocol to communicate over said backplane bus.

5. A system in accordance with claim 1, wherein: said collision code and said data packets are both transmitted on similar lines of said backplane bus.

6. A system in accordance with claim 1, wherein: said collision code is unique and unambiguous.

7. A communication method comprising the steps of:
providing a backplane bus with a plurality of slots;
transmitting a plurality of data packets on said backplane bus at said plurality of slots, each of said plurality of data packets including a plurality of bits;
creating a collision code on said backplane bus when two different bits are transmitted onto said backplane bus substantially simultaneously;
preceding each data packet transmitted on said backplane bus with said collision code being transmitted on said backplane bus;
providing a receiver means for receiving said data packets from said backplane bus;
transitioning said receiver means into an idle state if said backplane bus is empty of said data packets;
transitioning said receiver means from said idle state into an receive enable state if said collision code is received from said backplane bus;
recording said data packets from said backplane bus while said receiver means is in said receive enable state; and
transitioning said receiver means from said receive enable state into a collision state if said collision code is received from said backplane bus while said receiver means is in said receive enable state.

8. A method in accordance with claim 7, further comprising:
transitioning said receiver means from said collision state into said idle state when said collision code is removed from said backplane bus.

9. A method in accordance with claim 7, wherein:
said collison code is unique and unambiguous.

10. A backplane communication system comprising:
a backplane bus;
a plurality of transmitter means for transmitting data packets onto said backplane bus, said backplane bus and each of said transmitter means cooperating to have a substantially simultaneous transmission of two transmission means combine to cause a collision code on said backplane bus, each of said transmission means also preceding a data packet transmission on said backplane bus by transmitting a collison code on said backplane bus, each of said transmission means has a corresponding receiving means, and forms a communication node, each communication node having a unique combination of slot ID bits, said communication node includes a LAN controller which transmits and receives said data packets, said data packets include a preamble, said transmission means includes encoder means for replacing a portion of said preamble with said slot ID bits of said communication node; and
receiver means for receiving said data packets from said backplane bus, said receiver means being in an idle state when there is no data on said backplane bus, said receiver means transitioning to a receive enable state after receiving said collision code from said backplane bus, said receiver means transitioning from said receive enable state to a collision state when said collision code is received in said receive enable state.

11. A system in accordance with claim 10, wherein:
each of said receiver means includes a decoder means for replacing said slot ID bits in said data packets received from said backplane bus with said preamble.

12. A backplane communication system comprising:
a backplane bus including first and second lines;
a plurality of transmitter means for transmitting data packets onto said backplane bus, said backplane bus and each of said transmitter means cooperating to have a substantially simultaneous transmission of two transmission means combine to cause a collision code on said backplane bus, each of said transmission means also preceding a data packet transmission on said backplane bus by transmitting a collision code on said backplane bus, said transmission means transmits said data packets on said first and second lines in differential form; and
receiver means for receiving said data packets from said backplane bus, said receiver means being in an idle state when there is no data on said backplane bus, said receiver means transitioning to a receive enable state after receiving said collision code from said backplane bus, said receiver means transitioning from said receive enable state to a collision state when said collision code is received in said receive enable state.

13. A system in accordance with claim 12, wherein:
said first and second lines are normally in a high state and said transmission means leaves one of said first and second lines in a high state when a high state is to be transmitted on a corresponding one of said first and second lines, said transmission means also pulling one of said first and second lines into a low state when a low state is to be transmitted on a corresponding one of said first and second lines.

14. A system in accordance with claim 12, wherein:
said transmission means pulls said one of said first and second lines into said low state independent of any other transmission means leaving said one of said first and second lines in said high state.

15. A system in accordance with claim 12, wherein:
said collision code occurs on said backplane when both said first and second lines are in said low state.

16. A system in accordance with claim 12, wherein:
said collision code occurs on said backplane bus when a first transmission means transmits a high state on said first line and a low state on said second line, and a second transmission means transmits a low state on said first line and a high state on said second line causing both said first and second lines to be in said low state.

17. A communication method comprising the steps of:
providing a backplane bus with a plurality of slots;
providing each of said slots with a unique combination of slot ID bits;
transmitting a plurality of data packets on said backplane bus at said plurality of slots, each of said plurality of data packets including a plurality of bits;
providing each of said data packets with a preamble before said data packets are transmitted onto said backplane bus;

replacing a portion of said preamble with said slot ID bits of a slot from which said data packets are transmitted onto said backplane bus;

creating a collision code on said backplane bus if two different bits are transmitted onto said backplane bus substantially simultaneously;

preceding each data packet transmitted on said backplane bus with said collision code being transmitted on said backplane bus;

providing a receiver means for receiving said data packets from said backplane bus;

transitioning said receiver means into an idle state if said backplane bus is empty of said data packets;

transitioning said receiver means from said idle state into an receive enable state if said collision code is received from said backplane bus;

recording said data packets from said backplane bus while said receiver means is in said receive enable state; and transitioning said receiver means from said receive enable state into a collision state if said collision code is received from said backplane bus while said receiver means is in said receive enable state.

18. A method in accordance with claim 17, further comprising:

replacing said slot ID bits in said data packet with said preamble after said data packet has been received from said backplane bus.

19. A method in accordance with claim 17, further comprising:

providing channels on said backplane bus; and transmitting said slot ID bits, said collision code and said data packets over the same channels of said backplane bus.

20. A communication method comprising the steps of:

providing a backplane bus with a plurality of slots;

providing first and second lines on said backplane bus;

transmitting a plurality of data packets on said backplane bus at said plurality of slots, each of said plurality of data packets including a plurality of bits;

holding said first and second lines in a first state when no data packets are being transmitted onto said backplane bus;

differentially encoding said data packets onto said first and second lines during said transmitting of said plurality of data packets on said backplane bus, said transmitting changing a state of said first and second lines between said first state and a second state in accordance with said bits of said data packets, said transmitting leaving either of said first and second lines alone if said either of said first and second lines is to remain in said first state, said transmitting means changing said either of said first and second lines to said second state in accordance with a data packet and independently of other data packets indicating that said either of said first and second lines should be left in said first state;

creating a collision code on said backplane bus if two different bits are transmitted onto said backplane bus substantially simultaneously;

preceding each data packet transmitted on said backplane bus with said collision code being transmitted on said backplane bus;

providing a receiver means for receiving said data packets from said backplane bus;

transitioning said receiver means into an idle state if said backplane bus is empty of said data packets;

transitioning said receiver means from said idle state into an receive enable state if said collision code is received from said backplane bus;

recording said data packets from said backplane bus while said receiver means is in said receive enable state; and transitioning said receiver means from said receive enable state into a collision state if said collision code is received from said backplane bus while said receiver means is in said receive enable state.

21. A method in accordance with claim 20, wherein:

said collision code is represented by said first and second lines being in said second state.

* * * * *